(12) United States Patent
Matsushita et al.

(10) Patent No.: US 12,445,041 B2
(45) Date of Patent: Oct. 14, 2025

(54) DRIVE DEVICE AND POWER MODULE

(71) Applicant: Mitsubishi Electric Corporation, Tokyo (JP)

(72) Inventors: Narumi Matsushita, Tokyo (JP); Shinji Sakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 849 days.

(21) Appl. No.: 17/022,815

(22) Filed: Sep. 16, 2020

(65) Prior Publication Data

US 2021/0184564 A1    Jun. 17, 2021

(30) Foreign Application Priority Data

Dec. 16, 2019    (JP) .................... 2019-226168

(51) Int. Cl.
*H02M 1/32*    (2007.01)
(52) U.S. Cl.
CPC ....................... *H02M 1/32* (2013.01)
(58) Field of Classification Search
CPC ........ H02M 1/32; H02M 1/0009; H02M 1/08; H02M 7/5387; H02M 7/537; H02M 7/53871; H02H 7/122
(Continued)

(56) References Cited

U.S. PATENT DOCUMENTS 9,960,702 B2 *   5/2018   Uemura ................. H02M 1/32
2005/0231880 A1 * 10/2005 Sunaga ..................... H02P 7/29
                                                          361/118

(Continued)

FOREIGN PATENT DOCUMENTS

JP    H02-133067 A    5/1990
JP    H06-261540 A    9/1994
(Continued)

OTHER PUBLICATIONS

M. Adelmund, C. Bödeker and N. Kaminski, "Optimisation of Shunt Resistors for Fast Transients," PCIM Europe 2016; International Exhibition and Conference for Power Electronics, Intelligent Motion, Renewable Energy and Energy Management, 2016, pp. 1-8 (Year: 2016).*

(Continued)

*Primary Examiner* — Sreeya Sreevatsa
(74) *Attorney, Agent, or Firm* — Studebaker Brackett PLLC (57) ABSTRACT

Provided is a drive device capable of suppressing an overshoot of source potential of a switching element even when a resistance value of a shunt resistance for detecting current of the switching element is large. A drive device driving a lower side switching element of an inverter circuit includes a drive circuit generating a drive signal being input to a gate of the lower side switching element and an overcurrent detection circuit detecting overcurrent flowing in the lower side switching element. The overcurrent detection circuit detects overcurrent based on voltage occurring in a shunt resistance connected to a source of the lower side switching element. The drive circuit applies potential of a connection node of the source of the lower side switching element and the shunt resistance as reference potential, and generates a drive signal of the lower side switching element.

11 Claims, 6 Drawing Sheets

(58) Field of Classification Search
USPC .......................................................... 361/93.1
See application file for complete search history.

(56) References Cited

U.S. PATENT DOCUMENTS

| | | | | |
|---|---|---|---|---|
| 2010/0117577 | A1* | 5/2010 | Yanagishima | H02P 29/032 |
| | | | | 318/432 |
| 2012/0320478 | A1* | 12/2012 | Gosse | H02H 9/025 |
| | | | | 361/87 |
| 2013/0223114 | A1* | 8/2013 | Nakayama | H02M 1/32 |
| | | | | 363/55 |
| 2014/0118873 | A1* | 5/2014 | Lee | H02H 9/041 |
| | | | | 361/91.5 |
| 2015/0188308 | A1* | 7/2015 | Park | H02H 7/09 |
| | | | | 361/18 |
| 2016/0320783 | A1* | 11/2016 | Yoshii | G05F 1/575 |
| 2017/0264230 | A1* | 9/2017 | Yamada | H02M 1/32 |
| 2017/0365997 | A1* | 12/2017 | Kitamoto | H02H 3/006 |
| 2019/0027923 | A1 | 1/2019 | Toshiyuki | |
| 2019/0140634 | A1 | 5/2019 | Sakai | |
| 2019/0190514 | A1 | 6/2019 | Ohashi | |
| 2019/0296731 | A1 | 9/2019 | Sakai | |

FOREIGN PATENT DOCUMENTS

| | | | |
|---|---|---|---|
| JP | H10-042575 | A | 2/1998 |
| JP | 3560737 | B2 * | 9/2004 |
| JP | 2007-148530 | A | 6/2007 |
| JP | 2017-229119 | A | 12/2017 |
| JP | 2019-022348 | A | 2/2019 |
| JP | 2019-088152 | A | 6/2019 |
| JP | 2019-110431 | A | 7/2019 |
| JP | 2019-165347 | A | 9/2019 |

OTHER PUBLICATIONS

An Office Action mailed by China National Intellectual Property Administration on Oct. 31, 2023, which corresponds to Chinese Patent Application No. 202011460851.6 and is related to U.S. Appl. No. 17/022,815; with English language translation.

An Office Action; "Notice of Reasons for Refusal," mailed by the Japanese Patent Office on Jan. 31, 2023, which corresponds to Japanese Patent Application No. 2019-226168 and is related to U.S. Appl. No. 17/022,815; with English language translation.

* cited by examiner

FIG. 6

DRIVE DEVICE AND POWER MODULE

BACKGROUND OF THE INVENTION

Field of the Invention

The present disclosure relates to a drive device driving a switching element, and particularly to a drive device having an overcurrent protection function.

Description of the Background Art

Widely used is a power module supplying current to an inductor load such as a motor using an inverter circuit made up of a series circuit of a switching element on an upper side (P side) and a switching element on a lower side (N side). Known as a drive device driving a switching element is a drive device including an overcurrent detection circuit detecting that overcurrent flows in a switching element and a drive circuit having a function of protecting the switching element from the overcurrent when the overcurrent is detected (an overcurrent protection function).

Known as a method of detecting current flowing in a switching element performed by an overcurrent detection circuit is, for example, a method of detecting voltage occurring in a shunt resistance connected between a lower side switching element and a ground terminal (a terminal set in ground potential (GND)) (for example, Japanese Patent Application Laid-Open No. 2017-229119) and a method of adopting a switching element having a current sense terminal in which current, which is substantially proportional to a main current, flows to detect voltage occurring in a sense resistance connected between the current sense terminal and a ground terminal (for example, Japanese Patent Application Laid-Open No. 2019-22348). Used in any method is a comparator comparing voltage occurring in the shunt resistance or the sense resistance and a preset comparison reference voltage.

In a general power module, all of reference potential of the comparison reference voltage being input to the comparator of the overcurrent detection circuit, reference potential of the drive circuit driving the switching element, and reference potential of the shunt resistance or the sense resistance are set to have the same value. That is to say, all of the reference potential of the comparison reference voltage, the reference potential of the drive circuit, and the reference potential of the shunt resistance or the sense resistance for the lower side switching element are ground potential, and all of the reference potential of the comparison reference voltage, the reference potential of the drive circuit, and the reference potential of the shunt resistance or the sense resistance for the upper side switching element are potential of a source (emitter) terminal of the upper side switching element (for example, Japanese Patent Application Laid-Open No. 2019-110431).

In a configuration that the overcurrent detection circuit detects the voltage of the shunt resistance, when a resistance value of the shunt resistance is increased, the source potential of the switching element easily overshoots and exceeds a gate voltage, and a breaking or erroneous operation of the switching element easily occurs. When the resistance value of the shunt resistance is reduced, the occurrence of this problem can be suppressed, however, if the resistance value of the shunt resistance gets small, voltage occurring in the shunt resistance decreases, thus there arises a problem that a current detection accuracy decreases.

SUMMARY

An object of the present disclosure is to provide a drive device capable of suppressing an overshoot of source potential of a switching element even when a resistance value of a shunt resistance for detecting current of the switching element is large.

A drive device according to the present disclosure includes: an overcurrent detection circuit detecting overcurrent flowing in a switching element based on voltage occurring in a shunt resistance connected to a source of the switching element; and at least one drive circuit applying potential of a connection node of the source of the switching element and the shunt resistance as reference potential and generating a drive signal being input to a gate of the switching element.

According to the present disclosure, the reference potential of the drive circuit is the potential of the connection node of the switching element and the shunt resistance, thus the gate potential of the switching element changes in accordance with a fluctuation of the source potential. Thus, even when the source potential of the switching element fluctuates, a change of a gate-source voltage of the switching element is suppressed to a low level. Suppressed accordingly is that the source potential of the switching element overshoots and exceeds the gate voltage even when the resistance value of the shunt resistance is increased.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

Figure 1:
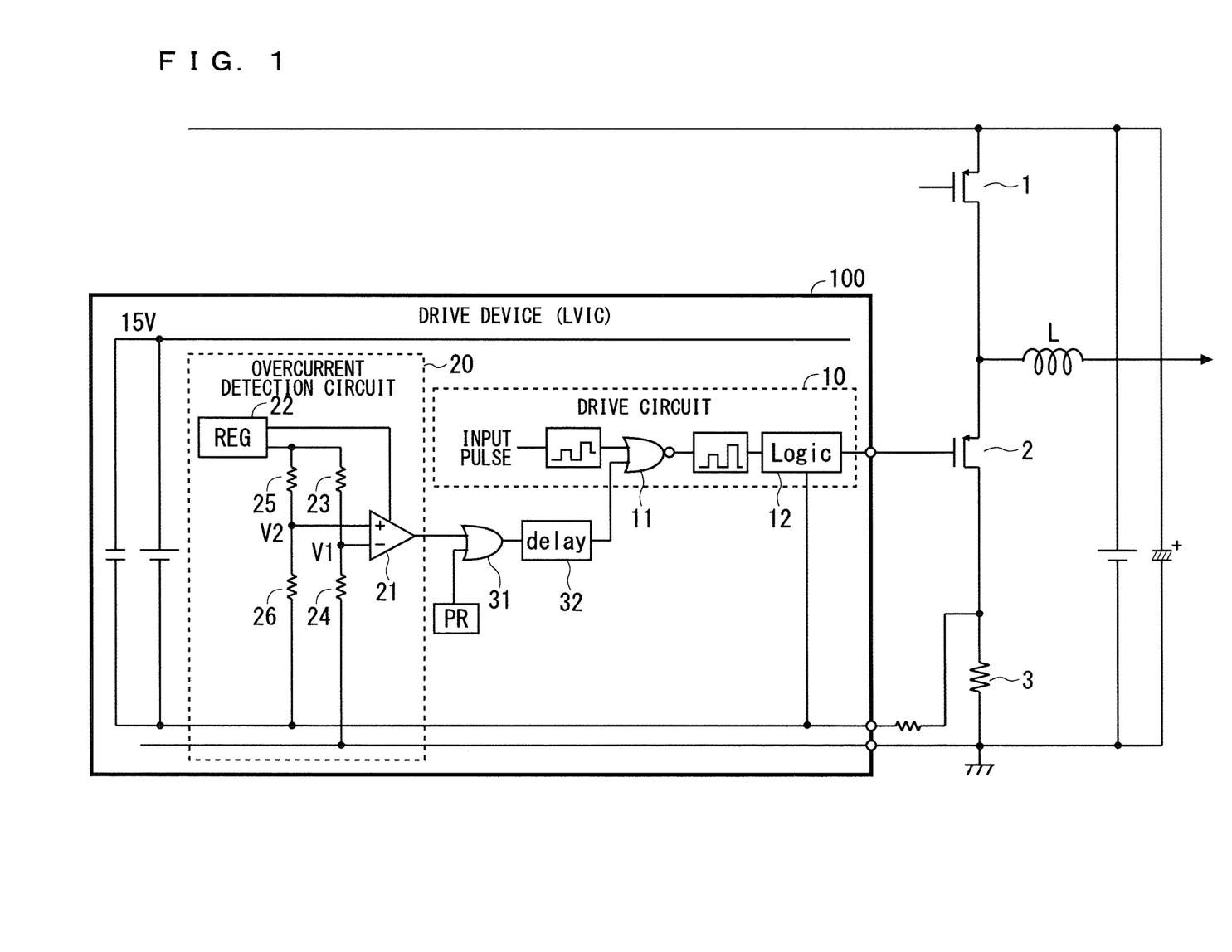
FIG. 1 is a drawing illustrating a configuration of a drive device according to an embodiment 1.

FIG. 1 is a drawing illustrating a configuration of a drive device 100 according to an embodiment 1. FIG. 1 illustrates an example that the drive device 100 is a low voltage integrated circuit (LVIC) driving a lower side switching element 2 of an inverter circuit made up of a series circuit of an upper side switching element 1 and the lower side switching element 2. The inverter circuit supplies current to an inductor load L such as a motor, for example. A shunt resistance 3 for detecting the current is connected between a source of the lower side switching element 2 and a ground terminal. The upper side switching element 1 and the lower side switching element 2 may be a bipolar transistor (BPT) or a metal oxide semiconductor field effect transistor (MOSFET).

The drive device 100 includes a drive circuit 10 and an overcurrent detection circuit 20. The drive circuit 10 generates a drive signal corresponding to an input pulse which is a control signal of the lower side switching element 2, and inputs the control signal to a gate of the lower side switching element 2. The overcurrent detection circuit 20 detects overcurrent flowing in the lower side switching element 2 based on voltage occurring in the shunt resistance 3.

The drive circuit 10 includes an NOR gate 11 and a gate logic circuit 12. The input pulse is input to one input terminal of the NOR gate 11, and an output signal of the overcurrent detection circuit 20 is input to the other input terminal thereof. The gate logic circuit 12 generates a drive signal corresponding to an output signal of the NOR gate 11, and inputs the drive signal to the gate of the lower side switching element 2. Herein, potential of a connection node of the lower side switching element 2 and the shunt resistance 3 (referred to as "the midpoint potential of the lower side switching element 2 and the shunt resistance 3" hereinafter) is supplied to the drive circuit 10 as reference potential. Thus, the reference potential of the drive signal being input from the drive circuit 10 to the gate of the lower side switching element 2 is the midpoint potential of the lower side switching element 2 and the shunt resistance 3.

The overcurrent detection circuit 20 includes a comparator 21, a power source circuit 22 (regulator), and resistance elements 23 to 26. The resistance elements 23 and 24 are connected in series between the ground terminal and an output terminal the power source circuit 22, and a connection node between the resistance elements 23 and 24 is connected to an inverting input terminal (− input terminal) of the comparator 21. The resistance elements 25 and 26 are connected in series between the connection node of the lower side switching element 2 and the shunt resistance 3 and the output terminal the power source circuit 22, and a connection node between the resistance elements 25 and 26 is connected to a non-inverting input terminal (+ input terminal) of the comparator 21.

That is to say, input to the inverting input terminal of the comparator 21 as a comparison reference voltage is a voltage V1 obtained by dividing the voltage between the ground potential and the output potential of the power source circuit 22 by the resistance elements 23 and 24. Input to the non-inverting input terminal of the comparator 21 as voltage for monitoring current flowing in the lower side switching element 2 is a voltage V2 obtained by dividing the voltage between the midpoint potential of the lower side switching element 2 and the shunt resistance 3 and the output potential of the power source circuit 22 by the resistance elements 25 and 26. The voltage V1 is referred to as "the comparison reference voltage" and the voltage V2 is referred to as "the monitor voltage" hereinafter.

In this manner, the resistance elements 23 and 24 constitute a first voltage-dividing circuit for generating the comparison reference voltage V1, and the resistance elements 25 and 26 constitute a second voltage-dividing circuit for generating the monitor voltage V2.

The comparator 21 compares the comparison reference voltage V1 and the monitor voltage V2, thereby determining whether the overcurrent flows in the lower side switching element 2. That is to say, the comparator 21 determines that the overcurrent flows in the lower side switching element 2 when the monitor voltage V2 exceeds the comparison reference voltage V1, and activates an output signal. The output signal of the comparator 21 (the output signal of the overcurrent detection circuit 20) is referred to as "the overcurrent detection signal" hereinafter. The overcurrent detection signal being output from the overcurrent detection circuit 20 is input to the NOR gate 11 of the drive circuit 10 via an OR gate 31 and a delay circuit 32. One input terminal of the OR gate 31 (an input terminal which does not receive the overcurrent detection signal) is connected to a power-on reset inverting control terminal PR to which a power-on reset inverting control signal is input. Although not shown in the drawings, for example, an error signal such as an overheat protection signal and a low voltage protection signal or a plurality of such error signals may be input to the input terminal of the OR gate 31 which does not receive the overcurrent detection signal instead of the power-on reset inverting control signal.

When the overcurrent detection circuit 20 activates the overcurrent detection signal, in the drive circuit 10, the NOR gate 11 blocks the input pulse, and a drive signal for turning off the lower side switching element 2 is output from the gate logic circuit 12. Accordingly, the lower side switching element 2 is protected from the overcurrent.

As described above, in the conventional power module, all of the reference potential of the comparison reference voltage being input to the comparator of the overcurrent detection circuit, the reference potential of the drive circuit driving the switching element, and the reference potential of the shunt resistance are set to have the same value. In contrast, in the drive device 100 according to the embodiment 1, the reference potential of the comparison reference voltage V1 being input to the comparator 21 of the overcurrent detection circuit 20 and the reference potential of the shunt resistance 3 are the ground potential, and the reference potential of the drive circuit 10 driving the lower side switching element 2 is the midpoint potential of the lower side switching element 2 and the shunt resistance 3.

Figure 2:
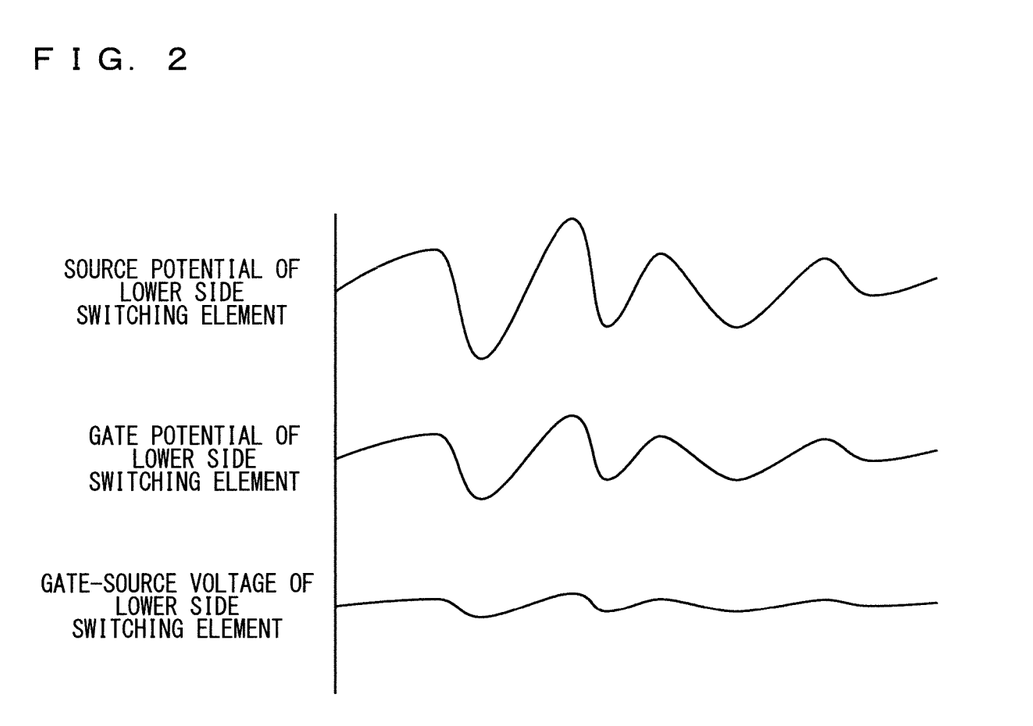
FIG. 2 is a drawing for describing an effect obtained by the drive device according to the embodiment 1.

The reference potential of the drive circuit 10 is the midpoint potential of the lower side switching element 2 and the shunt resistance 3, thus as illustrated in FIG. 2, the gate potential of the lower side switching element 2 (the potential of the drive signal being output from the drive circuit 10) changes in accordance with a fluctuation of a source potential of the lower side switching element 2. Thus, even when the source potential of the lower side switching element 2 fluctuates, a change of a gate-source voltage of the lower side switching element 2 is suppressed to a low level. Suppressed accordingly is that the source potential of the lower side switching element 2 overshoots and exceeds the gate voltage, thus the resistance value of the shunt resistance 3 can be increased.

In the conventional power module, the resistance value of the shunt resistance needs to be set so that voltage appearing in the shunt resistance at the time of occurrence of overcurrent is approximately 0.5V in accordance with a limitation of an operating point or accuracy of a comparator. In contrast, in the drive device 100 of the present embodiment, the comparison reference voltage V1 is generated by shifting a level of the reference potential (ground potential) of the shunt resistance 3 by the power source circuit 22 and the resistance elements 23 and 24, and the monitor voltage V2 is generated by shifting a level of the midpoint potential of the lower side switching element 2 and the shunt resistance 3 by the power source circuit 22 and the resistance elements 25 and 26. The levels of the comparison reference voltage V1 and the monitor voltage V2 can be set by the resistance values (division ratios) of the resistance elements 23 to 26, thus also obtained is an effect that the resistance value of the shunt resistance 3 can be set to an optional value. The level shifting for generating the comparison reference voltage V1 and the monitor voltage V2 may be performed by the other means such as a source follower, for example.

The levels of the comparison reference voltage V1 and the monitor voltage V2 may be adjustable. For example, each of a series circuit of the resistance elements 23 and 24 (the first voltage-dividing circuit) and a series circuit of the resistance elements 25 and 26 (the second voltage-dividing circuit) may be replaced with a ladder resistance made up of three or more resistance elements so that the node from which the comparison reference voltage V1 or the monitor voltage V2 is taken out can be changed. A trimming mechanism for adjusting the output potential may be provided inside the power source circuit 22. When the levels of the comparison reference voltage V1 and the monitor voltage V2 can be adjusted, an input range of the comparator 21 needs not be expanded to a low voltage side, thus the operating point of the comparator 21 can be easily designed, for example.

Figure 3:
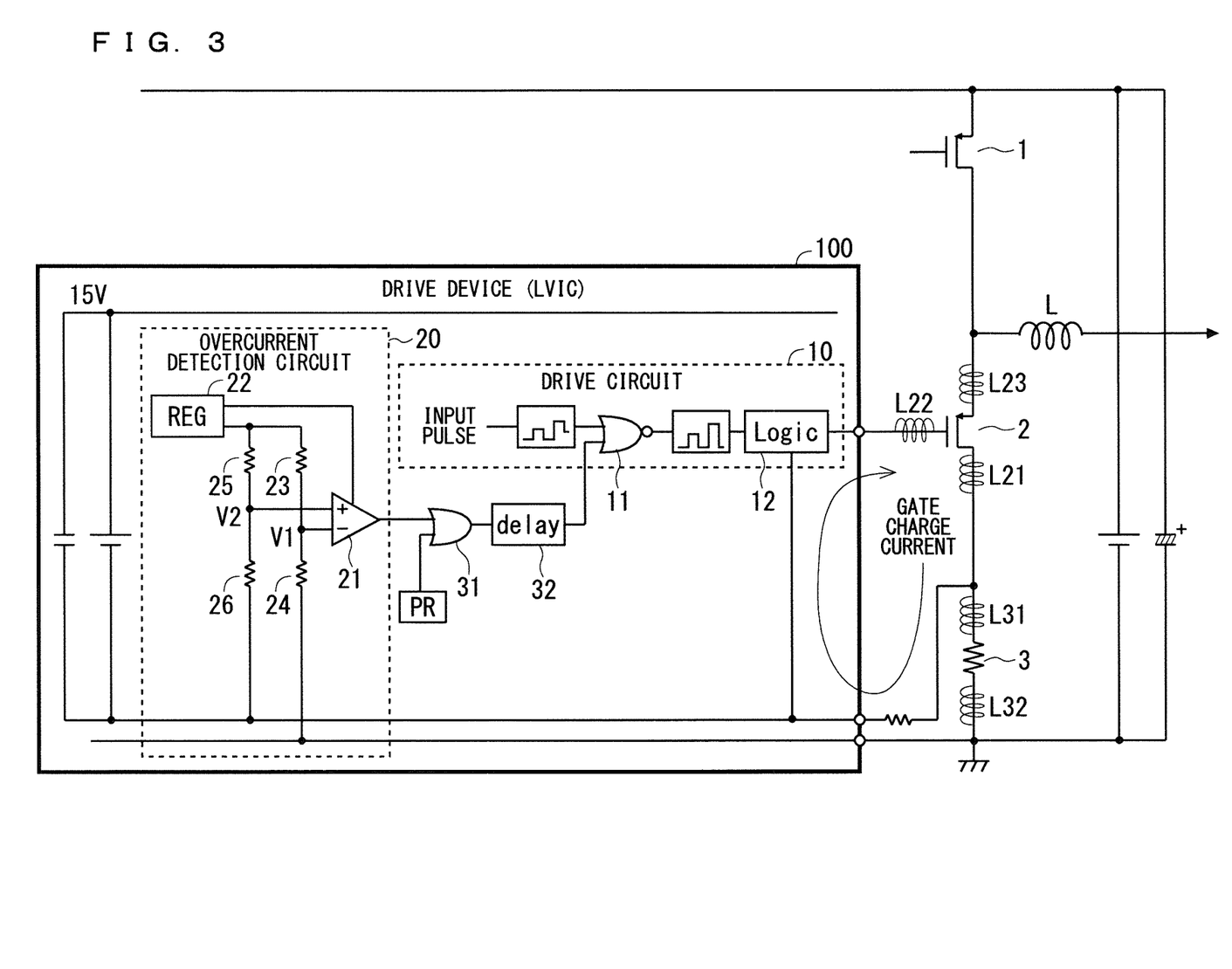
FIG. 3 is a drawing for describing an effect obtained by the drive device according to the embodiment 1.

The shunt resistance has a parasitic inductor with a value proportional to an area of the shunt resistance, and in the conventional power module, the shunt resistance is included in a loop of a gate charge current of the lower side switching element, thus an LCR resonance occurs by a gate charge current or an inverse electromotive force of the lower side switching element, and causes an erroneous operation of the overcurrent detection circuit in some cases. In the drive device 100 of the present embodiment, the shunt resistance 3 is separated from the loop of the gate charge current of the lower side switching element 2, and the loop does not include the parasitic inductor of the shunt resistance 3 (L31 and L32 illustrated in FIG. 3), thus also expectable is an effect that the occurrence of LCR resonance can be prevented.

Figure 4:
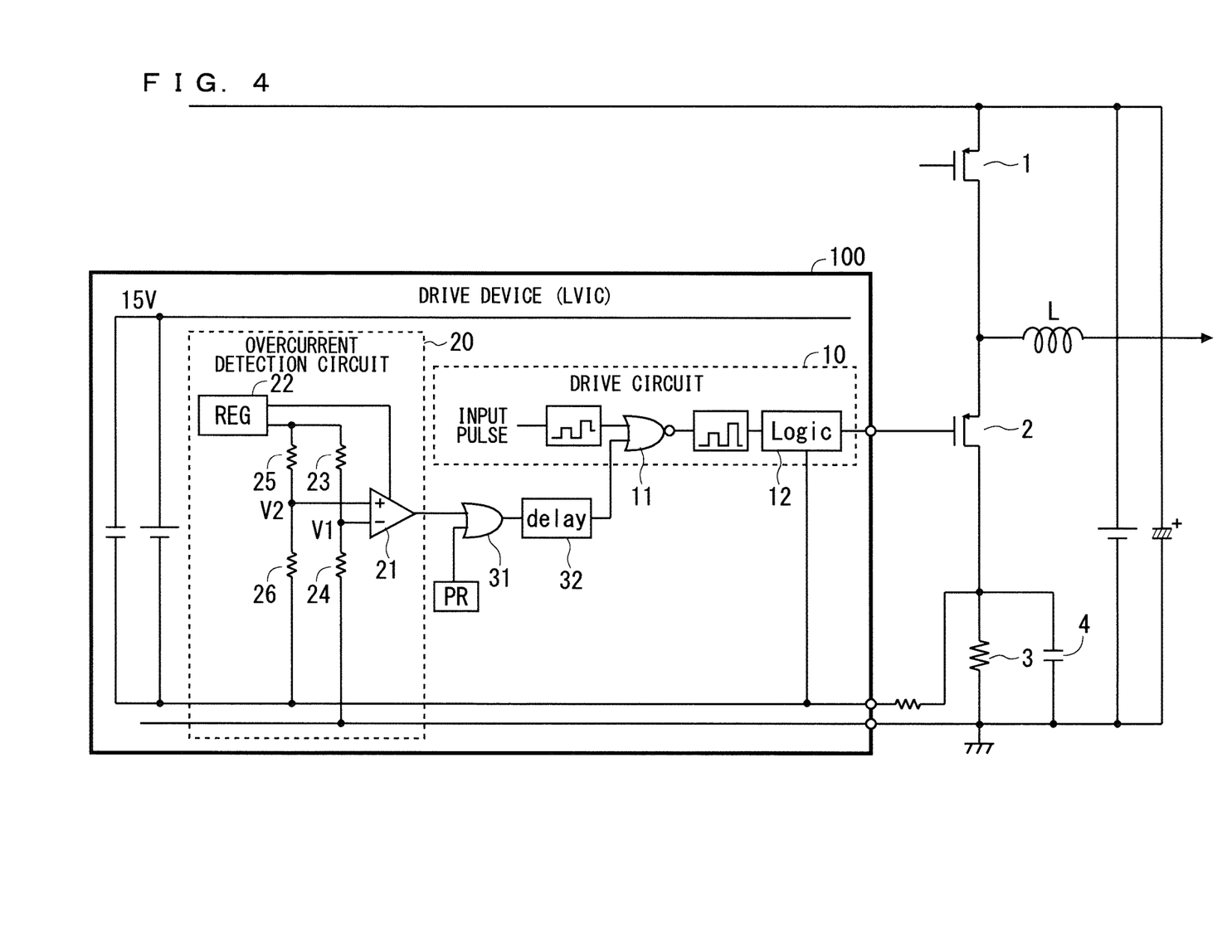
FIG. 4 is a drawing illustrating a modification example of the drive device according to the embodiment 1.
Figure 5:
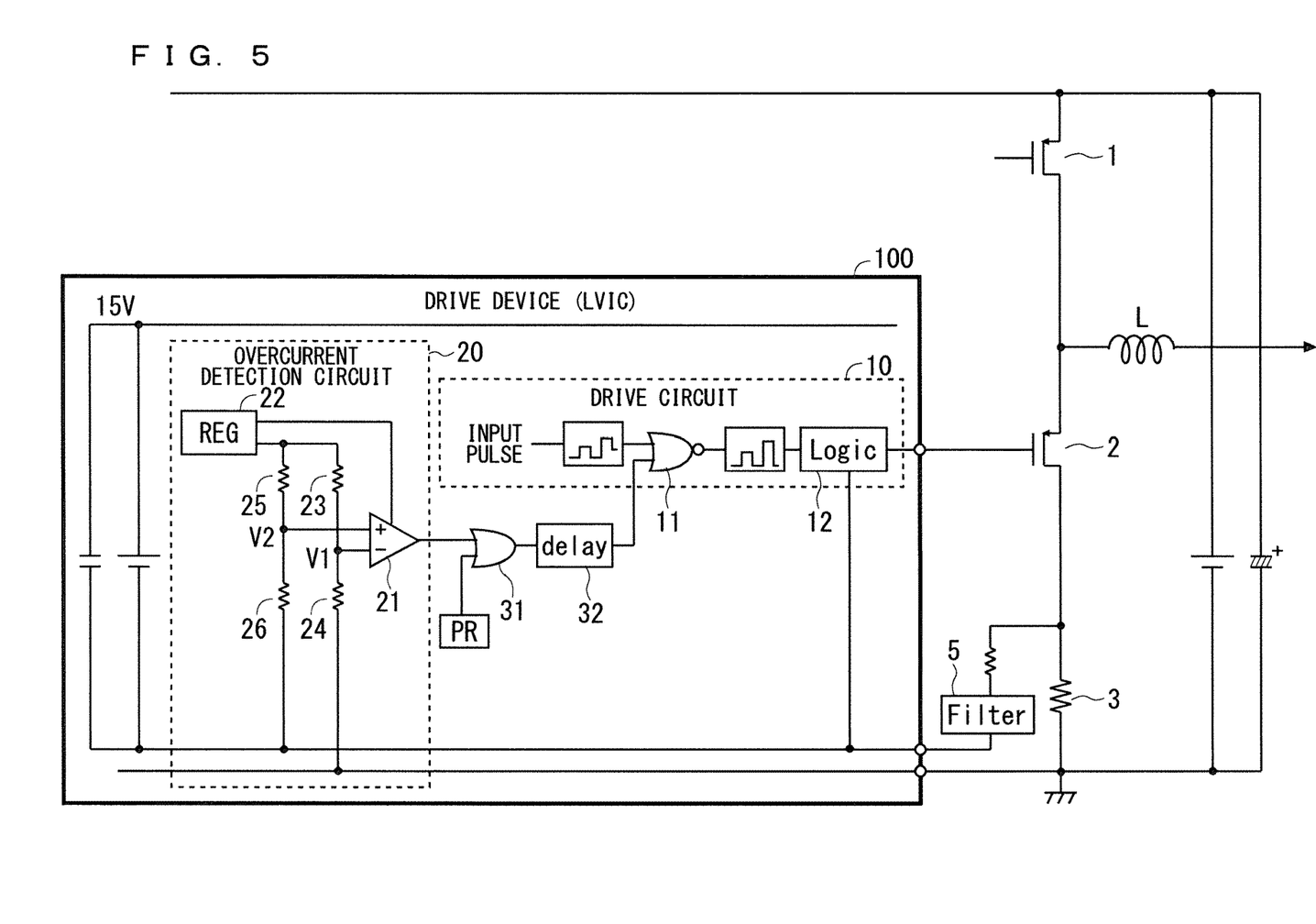
FIG. 5 is a drawing illustrating a modification example of the drive device according to the embodiment 1.

When there is a parasitic inductor (L21, L22, and L23 illustrated in FIG. 3) in each terminal of the lower side switching element 2 and the resonance occurs due to the large influence of the parasitic inductor (L21) of the source of the lower side switching element 2, as illustrated in FIG. 4, a capacitive element 4 may be connected in parallel to the shunt resistance 3 to move a resonance point, thereby reducing gain in a noise band. Furthermore, as illustrated in FIG. 5, a filter circuit 5 for removing a noise may be inserted into a path for supplying the midpoint potential of the lower side switching element 2 and the shunt resistance 3 to the drive circuit 10. The filter circuit 5 removes the noise other than the resonance.

The problem of the resonance tends to occur when di/dt is large, thus it is efficient to apply the capacitive element 4 and the filter circuit 5 when the upper side switching element 1 and the lower side switching element 2 are the switching elements for a high-speed operation. The switching element for the high-speed operation is a switching element made up of a wideband gap semiconductor of SiC, for example. A combination of the upper side switching element 1 and the lower side switching element 2 for the high-speed operation and the capacitance element 4 and the filter circuit 5 enables an implementation of a manufacture driven at a frequency which has been conventionally hard to achieve due to the resonance.

The upper side switching element 1, the lower side switching element 2, the shunt resistance 3, and the drive circuit 10 illustrated in FIG. 1 may be housed in one package to constitute a power module. Alternatively, it is also applicable that the upper side switching element 1, the lower side switching element 2, and the drive circuit 10 constitute a power module and the shunt resistance 3 is externally mounted. In the case of the example in FIG. 4 or 5, the capacitive element 4 connected in parallel to the shunt resistance 3 may be incorporated into a power module or externally mounted therein.

Embodiment 2

Figure 6:
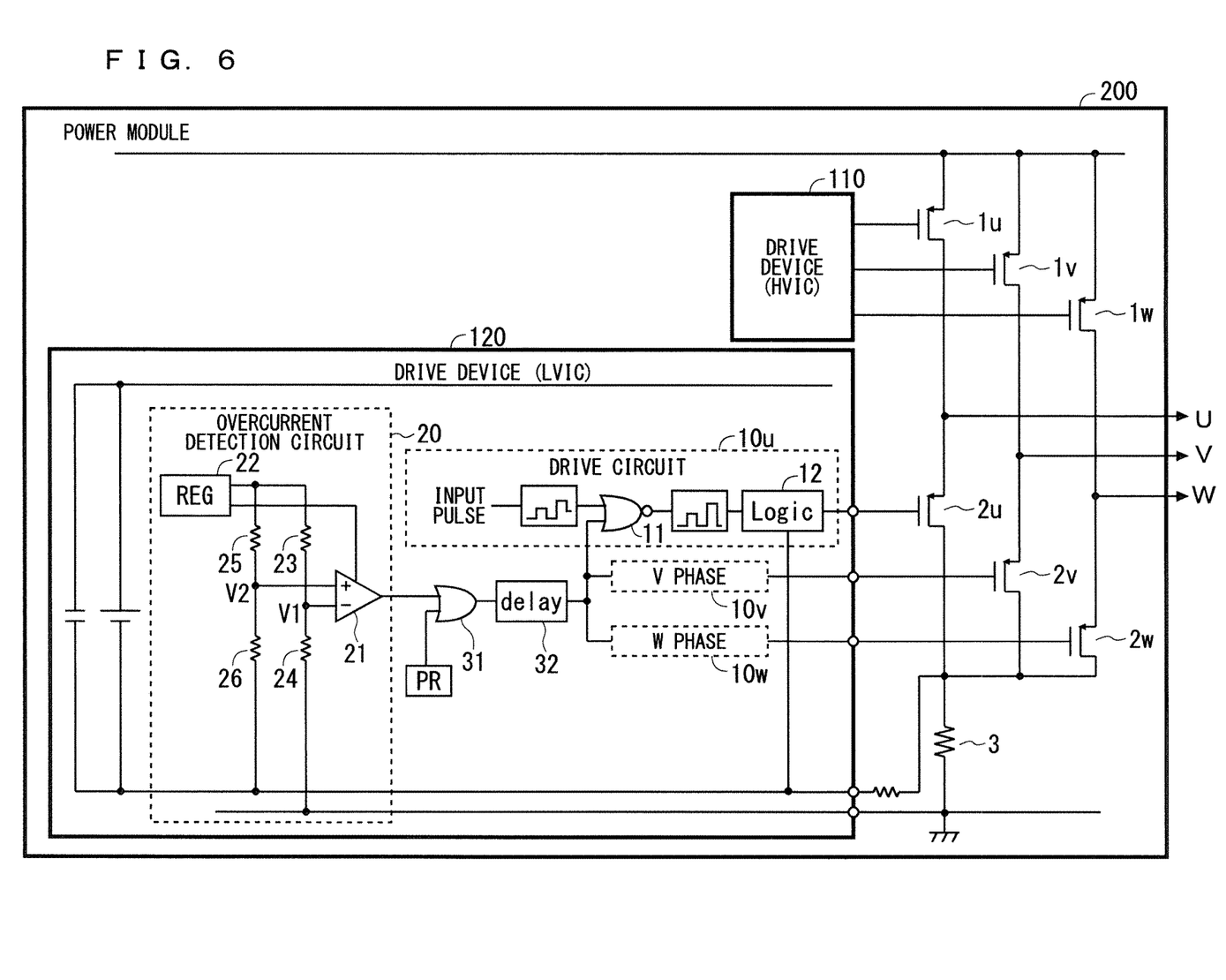
FIG. 6 is a drawing illustrating a configuration of a power module according to an embodiment 2.

FIG. 6 is a drawing illustrating a configuration of a power module 200 according to an embodiment 2. The power module 200 is a "6 in 1" type power module including an upper side switching element 1u and lower side switching element 2u constituting a U phase inverter circuit, an upper side switching element 1v and lower side switching element 2v constituting a V phase inverter circuit, an upper side switching element 1w and lower side switching element 2w constituting a W phase inverter circuit, and a high-voltage side drive device 110 and low-voltage side drive device 120 driving those elements. The upper side switching elements 1u, 1v, and 1w are driven by the high-voltage side drive device 110 which is a high voltage integrated circuit (HVIC), and the lower side switching elements 2u, 2v, and 2w are driven by the low-voltage side drive device 120 which is a low voltage integrated circuit (LVIC). Sources of the lower side switching elements 2u, 2v, and 2w are connected to each other, and the shunt resistance 3 is connected between the sources of the lower side switching elements 2u, 2v, and 2w and the ground terminal.

Although not shown in the drawings, the power module 200 may include a built-in reflux diode connected in anti-parallel to each of the upper side switching elements 1u, 1v, and 1w and the lower side switching elements 2u, 2v, and 2w and a built-in bootstrap diode supplying a power source to the high-voltage side drive device 110. The reflux diode and the bootstrap diode may be externally mounted on the power module 200. When each of the upper side switching elements 1u, 1v, and 1w and the lower side switching elements 2u, 2v, and 2w is a MOSFET, the reflux diode may be omitted by reason that the MOSFET includes a body diode.

In the present embodiment, the drive device 100 of the embodiment 1 is applied to the low-voltage side drive device 120. That is to say, the low-voltage side drive device 120 includes a drive circuit 10u driving the lower side switching element 2u, a drive circuit 10v driving the lower side switching element 2v, a drive circuit 10w driving the lower side switching element 2w, and the overcurrent detection circuit 20 similar to that in the embodiment 1. Each of the drive circuits 10u, 10v, and 10w has the same configuration as the drive circuit 10 of the embodiment 1, and the overcurrent detection signal being output from the overcurrent detection circuit 20 is input to the NOR gate 11 of each of the drive circuits 10u, 10v, and 10w via the OR gate 31 and the delay circuit 32.

The effect similar to that in the embodiment 1 can be obtained also in the power module 200 according to the embodiment 2. The power module has the 6 in 1 configuration, thus also obtained is an effect that a common impedance of U phase, V phase, and W phase ground potential can be suppressed.

Each embodiment can be arbitrarily combined, or each embodiment can be appropriately varied or omitted.

While the invention has been shown and described in detail, the foregoing description is in all aspects illustrative and not restrictive. It is therefore understood that numerous modifications and variations can be devised without departing from the scope of the invention.

What is claimed is:

1. A drive device configured to generate a drive signal for driving a gate of a switching element, comprising:
    an overcurrent detection circuit configured to detect overcurrent flowing in the switching element based on a voltage occurring in a shunt resistance connected to a source of the switching element; and
    at least one drive circuit configured to directly apply a shifted potential of a connection node of the source of the switching element and the shunt resistance as a reference potential and configured to generate the drive signal for driving the gate of the switching element.

2. The drive device according to claim 1, wherein
    the at least one drive circuit is configured to generate the drive signal for turning off the switching element, thereby protecting the switching element, when the overcurrent detection circuit detects the overcurrent.

3. The drive device according to claim 1, wherein
    the overcurrent detection circuit is configured to compare a comparison reference voltage obtained by shifting a level of reference potential of the shunt resistance and a monitor voltage obtained by shifting a level of the potential of the connection node of the switching element and the shunt resistance, and is configured to determine that the overcurrent occurs when the monitor voltage exceeds the comparison reference voltage.

4. The drive device according to claim 3, wherein
    the overcurrent detection circuit includes a power source circuit,
    the overcurrent detection circuit includes a first voltage-dividing circuit configured to generate the comparison reference voltage by dividing a voltage between the reference potential of the shunt resistance and an output potential of the power source circuit, and
    the overcurrent detection circuit includes a second voltage-dividing circuit configured to generate the monitor voltage by dividing a voltage between the potential of the connection node of the switching element and the shunt resistance and the output potential of the power source circuit.

5. The drive device according to claim 4, wherein
    the first voltage-dividing circuit is a ladder resistance configured to change a node from which the comparison reference voltage is taken out.

6. The drive device according to claim 4, wherein
    the second voltage-dividing circuit is a ladder resistance configured to change a node from which the monitor voltage is taken out.

7. The drive device according to claim 4, wherein
    the power source circuit includes a trimming mechanism configured to adjust the output potential.

8. The drive device according to claim 1, wherein
    a capacitive element is connected in parallel to the shunt resistance.

9. The drive device according to claim 1, wherein
    a filter circuit configured to remove a noise is included in a path for supplying the potential of the connection node of the switching element and the shunt resistance to the at least one drive circuit as the reference potential for the drive signal for driving the gate of the switching element.

10. A power module, comprising:
    three inverter circuits each including a series circuit of an upper side switching element and a lower side switching element;
    a high-voltage side drive device configured to drive the upper side switching element of each of the three inverter circuits; and
    a low-voltage side drive device configured to drive the lower side switching element of each of the three inverter circuits, wherein
    the low-voltage side drive device is the drive device according to claim 1, and
    the low-voltage side drive device includes three of the at least one drive circuits, each of the three of the at least one drive circuits being configured to generate a drive signal of the lower side switching element of a corresponding one of the three inverter circuits.

11. The drive device according to claim 1, wherein
    a reference node configured to provide the shifted potential of the connection node to the drive circuit as the reference potential is directly connected to the at least one drive circuit and directly connected to the overcurrent detection circuit.

* * * * *